Figure 1:
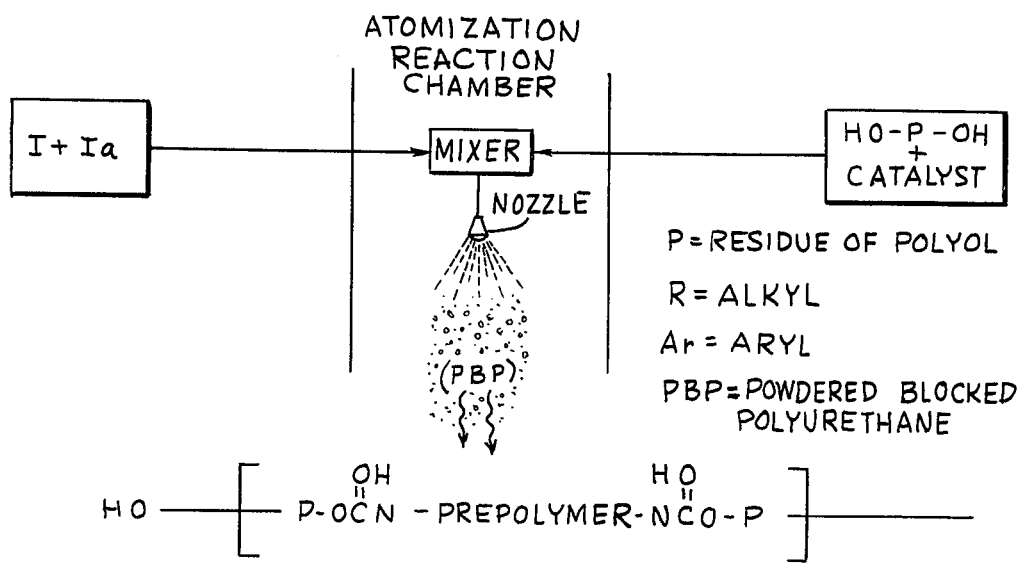

United States Patent [19]

Lander

[11] 4,101,473
[45] Jul. 18, 1978

[54] SOLID PARTICLE-FORM POLYMERIZABLE POLYMERIC MATERIAL AND COMPOSITIONS, STRUCTURES AND METHODS OF EMPLOYING AND PRODUCING THE SAME

[75] Inventor: Harry L. Lander, Muskegon, Mich.

[73] Assignee: Story Chemical Corporation, Muskegon, Mich.

[21] Appl. No.: 649,352

[22] Filed: Jan. 15, 1976

Related U.S. Application Data

[62] Division of Ser. No. 460,482, Apr. 12, 1974, Pat. No. 3,947,426.

[51] Int. Cl.$^2$ .............................................. C08G 18/80
[52] U.S. Cl. ................................ 260/13; 260/22 CQ; 260/22 R; 260/841; 260/858; 260/859 R; 260/859 PV; 528/45
[58] Field of Search ................ 260/77.5 TB, 841, 858, 260/859 R, 22 R, 22 CQ, 13, 859 PV

[56] References Cited

U.S. PATENT DOCUMENTS

| | | | |
|---|---|---|---|
| 3,438,922 | 4/1969 | Ueno et al. ........................... 260/841 |
| 3,678,129 | 7/1972 | Fischer ........................... 260/859 PV |
| 3,745,138 | 7/1973 | Koerner et al. .................. 260/859 R |
| 3,857,818 | 12/1974 | Frizelle ............................ 260/859 R |
| 3,879,330 | 4/1975 | Lustig ............................. 260/859 PV |
| 3,926,875 | 12/1975 | Tsugukuni et al. .......... 260/77.5 TB |
| 3,933,759 | 1/1976 | Hoeschele ................... 260/77.5 TB |
| 3,970,717 | 7/1976 | Muller-Albrecht et al. ........ 260/859 PV |

*Primary Examiner*—Eugene C. Rzucidlo
*Attorney, Agent, or Firm*—Cooper, Dunham, Clark, Griffin & Moran

[57] ABSTRACT

Solid particle-form, polymerizable or cross-linkable, multi-functional polymeric material containing blocked isocyanate groups wherein the blocked isocyanate groups making up said polymeric material comprise only a portion of the total isocyanate groups to produce said polymeric material, such as extrudable, thermosettable powdered blocked polyurethane (PBP) has been prepared. This material is useful per se for the manufacture of articles and may be added in combination with other materials, such as thermoplastic resin, e.g. polyethylene, polyvinyl cloride, for improving the usefulness, versatility and physical and/or chemical properties thereof. The polymeric material, such as PBP, is useful as a coating on metal and non-metallic surfaces, e.g. glass or fibrous surfaces, either as a protective coating or for the purpose of laminating such surfaces to another surface. The polymeric material, such as PBP, may be manufactured by reacting a liquid reaction admixture comprising a partially blocked polyurethane prepolymer with a chain extending reactant under conditions such that the reaction admixture is reacted in dispersed form with the result that the reaction product is recoverable in solid particle-form as said PBP.

7 Claims, 2 Drawing Figures

PREPOLYMER FORMATION

HO -P-OH + OCN -R -NCO + Ar OH ——— I + Ia
  1.0m        2.0m         0.1m

I = OCN -R- NHČO -P - OČHN - R - NCO
    0.9m ISOCYANATE PREPOLYMER

Ia = OCN -R- NHČO -P - OČHN - R - NHČO -Ar
    0.1m "BLOCKED" ISOCYANATE PREPOLYMER

CHAIN EXTENSION & POWDER FORMATION

P = RESIDUE OF POLYOL
R = ALKYL
Ar = ARYL
PBP = POWDERED BLOCKED POLYURETHANE

MAGNIFIED BLOCKED POLYURETHANE PARTICLE
(PBP)

SOLID PARTICLE-FORM POLYMERIZABLE POLYMERIC MATERIAL AND COMPOSITIONS, STRUCTURES AND METHODS OF EMPLOYING AND PRODUCING THE SAME

This is a division of application Ser. No. 460,482 filed Apr. 12, 1974, now U.S. Pat. No. 3,947,426.

This invention relates to solid particle-form, polymerizable or cross-linkable, multi-functional polymeric material. More particularly, this invention relates to a polymerizable polyurethane material useful for the manufacture of polyurethane article, as a coating material or as a material useful for improving the utility, versatility and physical and/or chemical properties of other materials, such as polyethylene, polyvinyl chloride, polystyrene, for improving the adhesiveness of such other materials to a substrate, such as a glass substrate.

The manufacture of polyurethane is well known, as is the preparation of blocked polyurethane, see U.S. Pat. Nos. 2,886,555, 2,935,487, 2,953,489, 2,953,839, 2,968,575, 3,398,043, 3,438,922, 3,567,695, 3,658,763, 3,705,119, 3,721,647, 3,745,138, 3,758,334 and 3,773,729. The disclosures of these patents are herein incorporated and made part of this disclosure.

It is an object of this invention to provide a solid, particulate, polymerizable or cross-linkable, multi-functional polymeric material which is extrudable and thermosettable and which can be employed for the manufacture of articles.

It is another object of this invention to produce a stable, polymerizable polyurethane material particularly useful as a coating or as an additive to other thermoplastic resins, such as polyethylene or polyvinyl chloride, to yield a material which, after processing, possesses improved utility and/or chemical and/or physical properties.

It is another object of this invention to provide a process for the manufacture of particulate, polymerizable or cross-linkable polymeric material.

Figure 2:
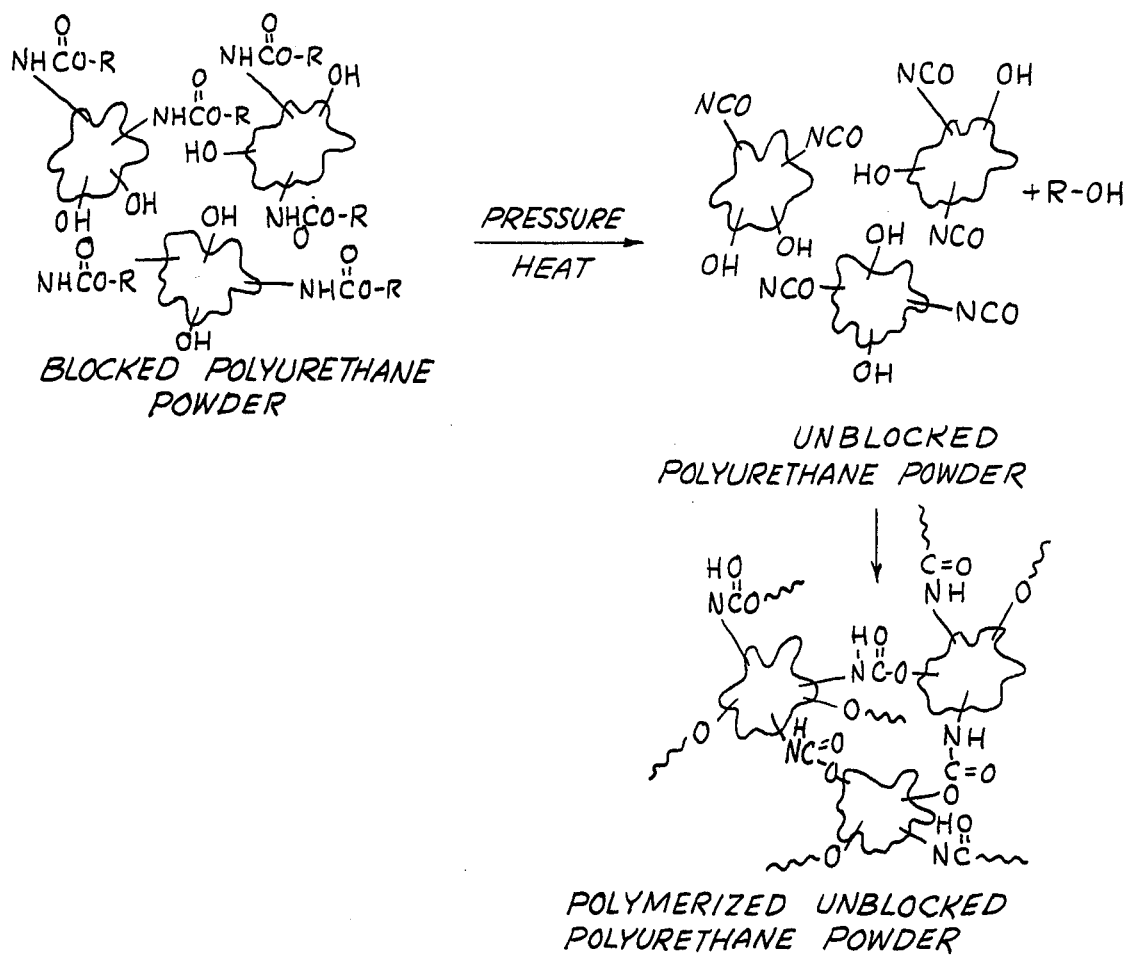

How these and other objects of this invention are accomplished will become apparent in the light of the accompanying disclosure and drawings wherein:

FIG. 1 illustrates one example of the chemical reactions involved in the preparation of the special polymerizable polyurethane materials in accordance with this invention and one method of preparing the same; and wherein FIG. 2 illustrates schematically how the polymerizable polyurethane materials in accordance with this invention may be processed to produce a finished polyurethane material.

In at least one embodiment of the practices of this invention at least one of the foregoing objects will be achieved.

In accordance with this invention solid particle-form, polymerizable or cross-linkable, multi-functional material containing blocked isocyanate groups, such as powdered blocked polyurethane (PBP), has been produced. The polymeric material, such as PBP, of this invention is a solid particle-form temperature sensitive polymerizable or multi-functional blocked polyurethane wherein the blocked isocyanate groups making up the polymerizable blocked polyurethane comprise only a portion of the total isocyanate groups employed to produce said polymerizable blocked polyurethane.

The special polymeric material produced in accordance with this invention, e.g. the powdered blocked polyurethane (PBP), is stable under normal conditions of temperature, pressure and humidity, possesses functional sites reactive at elevated temperatures, such as the temperatures at which the blocked isocyanate groups thereof are unblocked. Desirably, the polymeric material upon cross-linking, polymerization, reaction or fusion does not evolve gaseous products unless a foamed reaction product or polymerizate is desired.

The particulate polymeric material, such as PBP, may be cross-linked or reacted in a number of ways in addition to the cross-linking or polymerization of a mass thereof which would occur upon unblocking of the blocked isocyanate groups which would then react with other unblocked isocyanates and the functional groups carried by the polymeric material, such as OH, $NH_2$ and/or SH groups. The polymeric material might be, if desired, cross-linked via a peroxide cure involving a carbon-carbon linkage or by a sulfur cure involving a carbon-sulfur-carbon linkage. Desirably, the polymeric material should possess a high molecular weight providing sufficient internal cross-linking to insure maximum or desired physical properties when ultimately cured or polymerized. Also, the polymeric material should comprise finely divided solid particles, preferably of a size in the micron and sub-micron range, such as in the sub-micron range from about 0.01 to 0.9 micron, e.g. about 0.1 micron, and/or in the micron range from about 1 to about 2000 microns, e.g. 100–500 microns, to insure a particle surface area providing a sufficient number of reactive groups (unblocked isocyanate and other functional groups) for rapid reactivity when the polymeric material is heated to a temperature above the unblocking temperature of the blocked isocyanate groups.

Various techniques may be employed for the preparation of the particulate polymeric material in accordance with this invention. In accordance with one technique for the preparation of PBP as illustrated in FIG. 1, a liquid prepolymer material I and Ia terminated with isocyanate and blocked isocyanate groups, a chain extending reactant, such as a polyol, capable of reacting with the isocyanate groups and optionally a catalyst are combined to form a reaction mixture and the mixture then sprayed into a reaction zone for reaction therein to yield the resulting powdered blocked polymeric material, powdered blocked polyurethane (PBP).

Referring now to FIG. 1 of the drawings, prepolymer formation is carried out by reacting a polyol, such as a diol, with polyisocyanate, such as an alkyl diisocyanate, e.g. 1-6-hexamethylene diisocyanate, in the presence of a blocking agent, such as a phenol, e.g. m-cresol. When the polyol, the diisocyanate and phenol blocking agent are employed in the molar ratio 1:2:0.1 there would be produced a prepolymer made up of isocyanate prepolymer and blocked isocyanate prepolymer in the molar ratio about 0.9:0.1, as indicated in accompanying FIG. 1.

This prepolymer mixture made up of isocyanate terminated and blocked isocyanate terminated prepolymers would be reacted with a chain extending reactant, such as a polyol, a polyamine, an alkanol amine, a polythiol and the like. Usefully, in the reaction between the isocyanate prepolymers and the chain extending reactant a catalyst is present to improve the rate of reaction.

As indicated in FIG. 1, the atomized mixture of isocyanate prepolymer and chain extending reactant, such as a polyol, e.g. a diol, are allowed to react in the reaction chamber for a suitable period of time and at a suitable temperature with the resultant production of PBP. The reaction between the isocyanate prepolymers and the chain extending reactant results in the production of PBP made up of an isocyanate polymer portion or segment. A particle of the resulting produced PBP is shown in greatly enlarged scale in FIG. 1. This particle would comprise, in addition to an isocyanate polymer segment, a blocked isocyanate polymer segment including reactive functional groups, such as hydroxyl groups, as graphically illustrated in FIG. 1.

To effect polymerization or cross-linking of a number of such particles, a number of such particles or a mass thereof, as illustrated in accompanying FIG. 2, would be subjected to pressure and heat to effect unblocking of the blocked isocyanate groups of the blocked isocyanate polymer portion or segment thereof with the resulting cross-linking or reaction of the unblocked isocyanate groups with the other reactive functional groups already provided on the particles, such as the hydroxyl groups, all as graphically and schematically illustrated in FIG. 2.

Various techniques similar to the techniques for producing PBP illustrated in FIG. 1 or radically different therefrom may be employed for the preparation of PBP in accordance with this invention. For example, by employing the technique illustrated in FIG. 1, the atomized particles could be given an electrostatic charge and the walls of the reactor an electrostatic charge of the same sign with the result that the thus-charged particles would not coalesce on the wall but would react with the eventual production of PBP.

The reaction would be promoted by preheating the components or the mixture to a desired reaction temperature, such as above about 50°-100° C., more or less, depending upon the character of the reactants including the blocking agent making up the blocked isocyanate prepolymer present in the isocyanate prepolymer stream. By providing a large reaction chamber the coalesced reactants in droplet form or incipient solid particle form would tend to fall downwardly within the reaction chamber and be collected at the bottom thereof. The time required for the reactant droplets or particles to travel to the bottom of the reaction chamber is desirably sufficient to substantially complete the reaction for the production of the PBP. By flowing an inert gas countercurrent to the downwardly falling reactant droplets or particles the time of fall could be increased or decreased to control the reaction. Alternatively, a fast moving stream of inert gas could transport the formative PBP droplets or particles from the reaction chamber to a suitable collection or separation chamber, the time of travel or transport of the formative PBP droplets or particles being sufficient to complete the reaction with the formation of the production PBP. If an additional curing time should be required for the formative PBP particles to complete the reaction or curing this additional time could be provided by causing the incipient or formative PBP particles to be collected in a pool of liquid, such as warm water, at the bottom of the reaction chamber, with continuous stirring and permitting the PBP particles to remain in the pool until such time as the reaction and curing has been completed, then recovering the thus-formed PBP particles as product.

Instead of mixing the prepolymer and chain extending reactant prior to spraying, one can spray or atomize each component separately, giving them an opposite charge and causing them to impinge on one another. The droplets containing the prepolymer and the chain extender undergo reaction in the reaction chamber with eventual production and recovery of PBP as described hereinabove.

Another technique for the production of PBP would involve supplying a well mixed single stream containing the prepolymer and chain extending reactant to a vigorously stirred or agitated bath of liquid, such as into the vortex thereof, the liquid, such as water, being a nonsolvent and preferably non-wettable or immiscible with respect to the reactants and the production PBP. Upon which contact with the liquid bath the reaction admixture stream would be dispersed therein to fine droplets or incipient PBP particle size. The reaction mixture would be maintained dispersed, such as by stirring, for a sufficient period of time to effect completion of the reaction with the resulting production of PBP which then would be recovered, with drying if necessary, as product.

Still another technique useful for the production of PBP would involve forming a reaction admixture comprising isocyanate prepolymer including blocked isocyanate prepolymer, together with a chain extending reactant and a volatile liquid or diluent. The thus-formed reaction admixture would then be flowed or disposed in film form or as a coating onto a suitable substrate or surface and the reaction completed therein, preferably with agitation. Since the reaction is exothermal and is normally carried out and completed at an elevated temperature, e.g. above about 100° C., solvent or diluent provided in the reaction mixture would volatilize with resulting foaming or frothering of the reaction mixture and product which would then be recovered and comminuted to a desired particle size, thereby providing a technique for the production of PBP having a wide range of particle size distribution and which would be capable of being further treated, such as screening, to yield a PBP product of a selective or definite or narrow particle size range.

Yet another technique for the production of PBP would involve reacting a suitable mass of the PBP reactants to completion and solidification and then comminuting the resulting reaction product to form the product PBP.

In the preparation of the polymeric material in accordance with this invention numerous polyisocyanates, including triisocyanates, but preferably diisocyanates, may be employed. Suitable polyisocyanates are the aliphatic, cycloaliphatic and aryl polyisocyanates and include:

1,6-hexamethylene diisocyanate,
triphenyl-methane triisocyanate,
naphthylene diisocyanate,
4-tert-butyl-m-phenylene diisocyanate,
4,4'-methylene di-o-tolyl isocyanate
4,4'-methylenediphenyl isocyanate,
m-phenylene diisocyanate,
4-chloro-3,3-phenylene diisocyanate,
4,4'-biphenylene diisocyanate,
1,5-naphthylene diisocyanate,
1,4-tetramethylene diisocyanate,
1,10-decamethylene diisocyanate,
1,4-cyclohexylene diisocyanate,
4,4'-methylene-bis-(cyclohexyl isocyanate),
1,5-tetrahydronaphthylene diisocyanate,
toluene-2,4-diisocyanate,
4-chloro-1,3-phenylene diisocyanate,
diphenylmethane-4,4'-diisocyanate, ethylene diisocyanate,
ethylidene diisocyanate,
propylene-1,2-diisocyanate,
cyclohexylene-1,2-diisocyanate,
3,3'-dimethylbiphenylene-4,4'-diisocyanate,
3,3'-dimethoxybiphenylene-4,4'-diisocyanate,
3,3'-diphenylbiphenylene-4,4'-diisocyanate,
3,3'-dichlorobiphenylene-4,4'-diisocyanate,
triphenylene-p,p',p"-triisocyanate,
furfurylidene diisocyanate,
benzene triisocyanate,
hexane-1,2,6-triisocyanate,
2,2,4-trimethylhexamethylene diisocyanate,
methyl 2,6-diisocyanatocaproate,
4-methyl-1,3-diisocyanatocyclohexane,
4,4'-methylene-bis(cyclohexyl isocyanate),
methane diisocyanate,
N,N',N"-tris(6-isocyanatohexamethylene) biuret,
1-chloro-2,4-diisocyanatobenzene,
tris(4-isocyanatophenyl)methane,
naphthalene diisocyanates,
bis(2-isocyanatoethyl)benzene,
isophorone diamine diisocyanate,
triphenylsulfone triisocyanate,
trimethylbenzene-2,4,6-triisocyanate,
1-methylbenzene-2,4,6-triisocyanate,
diphenyl-2,4,4'-triisocyanate.

Di- or triisocyanates prepared by reacting an excess amount of one of the above-mentioned isocyanates with a low molecular diol or triol (e.g. ethylene glycol, propylene glycol, 1,3-butylene glycol, neopentyl glycol, 2,2,4-trimethyl-1,3-pentandiol, hexamethylene glycol, cyclohexane dimethanol, trimethylol propane, hexane triol, glycerine, or polymers thereof, etc.), trimers or diisocyanates and other various di-or triisocyanates containing biuret linkages and/or allophanate linkages and isocyanate prepolymers prepared from the above polyisocyanates are also useful.

As the blocking agent, any of the known blocking agents may be used in the practice of this invention. Typical examples are phenol type blocking agents (e.g. phenol, cresol, xylenol, nitrophenol, chlorophenol, ethyl phenol, t-butylphenol, hydroxy benzoic acid, hydroxy benzoic acid esters, 2,5-di-t-butyl-4-hydroxy toluene, etc.), lactam type blocking agents (e.g. ε-caprolactam, δ-valerolactam, γ-butyrolactam, β-propiolactam, etc.), active methylene type blocking agents (e.g. diethyl malonate, dimethyl malonate, ethyl acetoacetate, methyl acetoacetate, acetyl acetone, etc.), alcohol type blocking agents (e.g. methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxyethanol, glycolic acid, glycolic acid esters, lactic acid, lactic acid ester, methylol urea, methylol melamine, diacetone alcohol, ethylene chlorohydrine, ethylene bromhydrine, 1,3-dichloro-2-propanol, ω-hydroperfluoro alcohol, acetocyanhydrine, etc.), mercaptan type blocking agents (e.g. butyl mercaptan, hexyl mercaptan, t-butyl mercaptan, t-dodecyl mercaptan, 2-mercapto-benzothiazole, thiophenol, methyl thiophenol, ethyl thiophenyl, etc.), acid amide type blocking agents (e.g. acetoanilide, acetoanisidine amide, acrylamide, methacrylamide, acetic amide, stearic amide, benzamide, etc.), imide type blocking agents (e.g. succinimide, phthalimide, maleimide, etc.), amine type blocking agents (e.g. diphenylamine, phenylnaphthylamine, xylidine, N-phenyl xylidine, carbazole, aniline, naphthylamine, butylamine, dibutylamine, butyl phenylamine, etc.), imidazole type blocking agents (e.g. imidazole, 2-ethylimidazole, etc.), urea type blocking agents (e.g. urea, thiourea, ethylene urea, ethylene thiourea, 1,3-diphenyl urea, etc.), carbamate type blocking agents (e.g. N-phenyl carbamic acid phenyl ester, 2-oxazolidone, etc.), imine type blocking agents (e.g. ethylene imine, etc.), oxime type blocking agents (e.g. formaldoxime, acetaldoximine, acetoxime, methylethyl ketoxime, diacetylmonoxime, benzophenoxime, cyclohexanonoxime, etc.) and sulfurous acid salt type blocking agents (e.g. sodium bisulfite, potassium bisulfite, etc.). Of these, use is preferably made of the phenol type, the lactam type, the active methylene type and the oxime type blocking agents.

In the selection of the blocking agent for the preparation of the blocked isocyanate prepolymers, it is especially desirable that the blocking agent be non-volatile when the blocked isocyanate polymer, i.e. the PBP, is heated or activated for the unblocking of the blocked isocyanate groups therein. It is desirable that the blocking agent be substantially non-volatile so that upon heating of the PBP the blocking agent does not volatilize into the unblocked PBP. If volatilization of the blocking agent should occur the resulting unblocked polymerized or cross-linked or reacted PBP or PBP-containing composition would tend to have bubbles formed therein. While it is preferred to employ phenolic compounds which do not volatilize in the preparation of PBP in accordance with this invention, other non-volatile blocking agents are useful. By the term "non-volatile" it is meant those blocking agents which do not volatilize under the conditions of use or practice of this invention, i.e. do not cause bubbles to form within the unblocked PBP. Another important property of the blocking agent is that it be compatible with the PBP before and after unblocking and curing. This property is important since the released blocking agent, after unblocking, remains in the PBP. Particularly useful as non-volatile blocking agents in accordance with this embodiment of the invention are the high molecular weight substituted phenolic compounds, e.g. the bisphenols, the di- and tri-hydroxy substituted benzenes and the substituted phenols where the substituent is on the aromatic nucleus, all the mentioned compounds having a molecular weight substantially above 100. Preferred blocking agents, as mentioned hereinabove, are the monofunctional high molecular weight substituted phenols having a molecular weight above 150, preferably the compound p-phenylphenol. Depending upon the blocking agent selected the unblocking of the isocyanate group occurs at varying temperatures. The choice of unblocking conditions usually determines the selection of the blocking agent employed, other conditions remaining equal. For example, the preferred temperature range in which the PBP materials of this invention become reactive and the blocked isocyanate groups thereof unblocked is in the range from about 110°–160° C. to about 200°–225° C., more or less.

Although a catalyst is not necessary, it is preferred in the preparation of PBP in accordance with the various embodiments and techniques of this invention to employ a catalyst. Suitable catalysts include such tin salts as dibutyl tin dilaurate, stannous octoate, dibutyl tin diacetate, corresponding zinc salts, such as zinc octoate, iron salts, such as ferric acetyl acetonate. Non-metallic catalysts are also useful including the tertiary amine catalysts, such as triethylamine, triethylenediamine, tetramethylbutane diamine, N-methyl morpholine, N,N'-diethyl piperazine, N,N'-dimethylhexahydroanaline, tribenzylamine and the like.

The reactants or chain extending reactants suitable for reaction with the isocyanate prepolymers, and indeed for reaction with the polyisocyanates, are preferably active hydrogen-containing compounds capable of reacting with isocyanates. Although water is included within this definition of a chain extending reactant, water is not a preferred chain extending reactant. It is preferred to employ organic compounds containing at least two atoms in the molecule to which are attached active hydrogen atoms. The term "active hydrogen atoms" refers to hydrogens which, because of their position in the molecule, display activity according to the Zerewitinoff Test as described by Kohler in J. Am. Chem. Soc. 49, 3181 (1927). In the chain extending organic compounds employed in accordance with the practices of this invention for the production of PBP the active hydrogen atoms are usually attached to oxygen, nitrogen and/or sulfur atoms. Typical of the many organic compounds which are useful are ethylene glycol, hexamethylene glycol, diethylene glycol, adipic acid, terephthalic acid, adipamide, 1,2-ethane dithiol, hydroquinone, monoethanolamine, 4-aminobenzoic acid, m-phenylene diamine, propylene diamine, 4-aminobenzamide, sulfanilamide, aminopropionic acid, 1,4-cyclohexane disulfonamide, 1,3-propane disulfonamide, 4-hydroxybenzoic acid, p-aminophenol, ethylenediamine, succinic acid, succinamide, 1,4-butanedisulfonamide, 2,4-tolylenediamine, bis(4-amino-phenyl)methane, beta-hydroxy-propionic acid and 1,2-ethane disulfonic acid. Suitable reactants include polymers having a molecular weight in the range from about 300 to 5000 and higher or lower having terminal hydroxyl groups or terminal groups with active hydrogen atoms. Such polymers may be a chain extending polyester made from a glycol, such as a mixture of ethylene and propylene glycols, and a saturated organic dicarboxylic acid, preferably such as adipic acid. Glycols containing 4–20 atoms and dicarboxylic acids containing 4–20 carbon atoms are preferred. An excess of a glycol component over an acid component is used in preparing the polyester so that the resulting polyester contains terminal hydroxyl groups. Other useful polyesters are polyethylene adipate, polyethylene adipate-phthalate, polyneopentyl sebacate. Polyethers are also useful such as those polyethers possessing ether linkages separated by hydrocarbon chains, either alkyl or aryl in nature.

Further exemplary of the chain extending reactants useful in the preparation of PBP in accordance with this invention, in addition to the glycols mentioned hereinabove, are the acrylic polyols, hydroxyl terminated polyesters, poly(oxyalkylene)glycols, castor oil, diamines and poly(oxyalkylene) triols. Examples representative of useful polyols are diols such as propylene glycol, poly(oxypropylene)glycol having a molecular weight of between about 400 and 5000, and poly(oxypropylene)-poly(oxyethylene)glycols (block copolymers, which may be hydroxypropylene-terminated) having a molecular weight of from about 1000 to 3000; triols such as poly(oxypropylene) adducts of glycerin or trimethylolpropane or of trimethylolethane having a molecular weight of from 400 to 5000; polyvinyl alcohol, polymers and copolymers of hydroxyalkyl acrylates or methacrylates with other ethylenically unsaturated monomers, poly(oxypropylene)-poly(oxyethylene) adducts of trimethylopropane having a molecular weight of 4000 to 5000; tetrols such as poly(oxypropylene) adducts of pentaerythritol having a molecular weight of 400 to 1000; and hexols such as the poly(oxypropylene) adducts of sorbitol, having a molecular weight of 500 to 5000, and the like.

Nitrogen-containing chain extending reactants providing active hydrogens useful in the preparation of PBP in accordance with this invention in addition to those mentioned hereinabove include the amine-containing resins prepared by reacting dimerized fatty acids with ethylene diamine or diethylene triamine, and N,N'-bis(3-hydroxypropyl)oxamide.

The preferred ratio on an equivalent basis of —N=•C=O/active hydrogen in the preparation of PBP in accordance with this invention is about 1/1 but a ratio in the range from about 7.75/1 to about 1.5/1 and ratios in the range from about 0.5/1 to about 2-3/1 are useful.

The following examples are illustrative of the practices of this invention:

EXAMPLE NO. 1

Preparation of PBP

PBP is prepared by reacting a liquid hydroxyl-terminated homopolymer of butadiene supplied by Arco Chemical Co. under the tradename R-45 characterized by the structural formula,

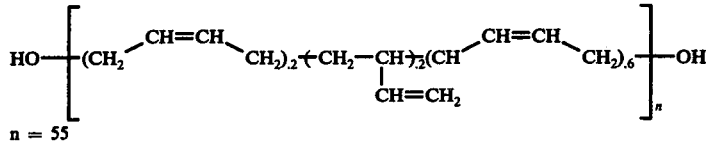

with tolylene diisocyanate, followed by the addition of a phenol as blocking agent for a portion of the isocyanate groups. The resulting polyurethane prepolymer containing blocked polyurethane prepolymer was then chain extended by reaction with a polyol or diamine.

The liquid hydroxylated butadiene homopolymer is heated and degassed under reduced pressure and a minor amount of benzoyl chloride, about 0.03% by weight, added thereto. After stirring for a few minutes tolylene diisocyanate (TDI), a slight excess (e.g. 2:1) or at least one equivalent of TDI per OH group, is added over a period of a few minutes at a temperature in the range from about 100° to about 125° F. and the resulting reaction admixture heated with stirring to a temperature of about 140° F., the stirring being carried out at a subatmospheric pressure of about 50 mm Hg absolute for a period of about 1 hour. Thereupon, phenol in an amount in the range from about 3 to about 10 molar wt.% of the free isocyanate groups is added to the reactor contents with stirring. The resulting formed prepolymer is filtered and admixed with N,N-bis(2-hydroxypropyl)aniline (Isonol C-100; Upjohn Co.), together with a minor amount of dibutyltin dilaurate, as catalyst. The blocked prepolymer and the chain extending reactant are mixed in an amount so as to provide an NCO-/OH ratio equal to about 1. The mixed reactants are then forced through an atomizing nozzle into a reaction chamber into contact with a countercurrent stream of warm air so that the atomized reaction mixture or droplets fall slowly downward within the reaction chamber. Desirably, the atomized droplets and the walls of the reaction chamber are electrically charged with like charges so as to avoid deposition on the reactor walls. At the bottom of the chamber desirably is provided a stirred pool of non-solvent liquid, such as water, into which the coalesced partially cured or fully cured reaction mixture droplets fall and collect as discrete droplets or particles. Desirably, the pool of liquid, such as water, in the bottom of the reaction chamber is stirred and maintained at an elevated temperature, such as a suitable temperature in the range 60°–85° C. to provide for the completion of the reaction with eventual production of PBP. The resulting produced PBP is recovered and after drying to remove the water or other liquid material therefrom is recovered as product.

In one preparation of PBP in accordance with the foregoing technique the parts by weight of the reactants employed would be about 100 parts by weight hydroxyl terminated polybutadiene, 0.5 part by weight dibutyltin dilaurate catalyst and 21.3 parts by weight Isonol C-100. The aforesaid reactants in parts by weight would provide an NCO/OH ratio of 1. Instead of effecting chain extension of the isocyanate prepolymer with a diol the chain extension of the isocyanate prepolymer, including the blocked isocyanate prepolymer, could be effected with a glycol, such as 2-ethyl-1,3-hexane diol, or by a diamine or a polyester.

EXAMPLE NO. 2

Preparation of 50% Blocked Isocyanate Prepolymer

Crystalline phenol in the amount of 20.9 grams (0.2225 mol) was added with stirring to 100 grams of an isocyanate terminated polycaprolactone prepolymer, Isonate No. 225 supplied by Upjohn Co., having an NCO content of about 18.8% by weight (0.45 mol NCO per 100 grams) at a temperature of 80° C. The resulting reaction admixture was stirred for 10 minutes, permitting the temperature to rise to about 95° C. There was produced a 50% blocked isocyanate prepolymer of the general formula:

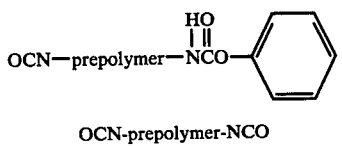

OCN-prepolymer-NCO   II

By following the same procedure a 25% NCO blocked isocyanate prepolymer was prepared by the addition of half the amount of phenol, 10.45 grams (0.1125 mol).

EXAMPLE NO. 3

Chain Extension of Blocked Isocyanate Prepolymer with Ethylenediamine

To a stirred mass of 98% ethylenediamine there was added by dripping a stream of the 50% blocked isocyanate prepolymer of Example No. 2 at a temperature of about 70° C. The added prepolymer gelled upon contact with the ethylenediamine. The resulting precipitated particles were washed with water and dried to yield PBP. The reactions carried out in this example and the resulting reaction product are indicated in the accompanying equation:

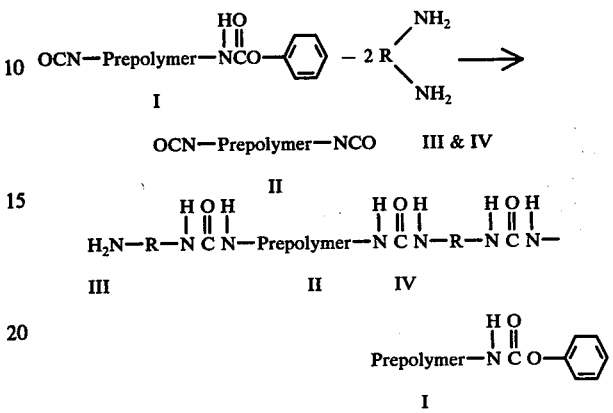

EXAMPLE NO. 4

Reaction of Partially Phenol Blocked Isocyanate Prepolymer with a Diol 25 grams of a 50% phenol blocked isocyanate prepolymer, prepared in accordance with Example No. 2, at a temperature of about 40° C. was reacted with a mixture of 4 grams of 1,4-butanediol and 0.25 gram of dibutyltin dilaurate at a temperature of 27° C. to produce a foamed rubber like product of good integrity.

In a similar manner 22.5 grams of a 25% phenol blocked isocyanate prepolymer produced in accordance with Example No. 2 was reacted with 1,4-butanediol and dibutyltin dilaurate to produce a foamed rubber product of good integrity.

When a portion of the rubber like product prepared from the 25% blocked isocyanate prepolymer and measuring 1½ inches in diameter and ¼ inch thick was placed between aluminum foil compressed between heated platens at a pressure of about 1000 psi and at a temperature of 160°–165° C. for 2 minutes the polymer material exhibited definite thermoplastic behavior and due to plastic flow the diameter increased to 2½ inches and the thickness decreased to 1/16 inch. The resulting polymer was translucent, had a mirror finish and was rubbery. Evidence of unblocking of the partially blocked prepolymer was indicated by a phenol odor liberated during heating and compression.

EXAMPLE NO. 5

Chain Extension of Partially Blocked Isocyanate Prepolymer

To 15 grams of 25% phenol blocked isocyanate terminated prepolymer prepared in accordance with Example No. 2 was added 0.1 gram of dibutyltin dilaurate and 6.7 grams of N,N'-bis(2-hydroxypropyl)aniline (Isonol C-100 manufactured by Upjohn Co.). The resulting reaction was carried out at a temperature of about 70° C. and was highly exothermic and was completed within about 1 minute. 5 grams of the resulting product were placed in an aluminum foil pan on a hot plate having a surface temperature of about 200°–250° C. When the polymer material started to melt a flat-bottom glass container was placed thereon and pressed onto the polymer and held for about 3½ minutes. Upon heating to a temperature sufficient to cause unblocking, the polymer became transparent and almost colorless. It was then removed from the hot plate, cooled and the aluminum pan removed. It was found that the polymer had fused and tenaciously adhered to the glass surface.

EXAMPLE NO. 6

Preparation of PBP 9.5 grams of phenol was added to 108 grams (0.5 mol NCO) of NCO terminated polycaprolactone containing about 18.8% NCO by weight (Isonate No. 225 sold by the Upjohn Co.). The resulting admixture was heated with stirring to 70° C., then held at room temperature for about 24 hours. To the resulting reaction admixture containing the blocked prepolymer there was added 21.8 grams of 1,4-butanediol containing 0.05 gram of dibutyltin dilaurate as catalyst. The resulting liquid mixture was then poured slowly as a thin stream into the vortex of a stirred, hot, oil bath maintained at a temperature of 140° C. After the liquid mixture had been poured into the oil bath the oil bath was permitted to cool but was continuously stirred for another 15 minutes. During this 15 minute post-cure period the oil bath temperature dropped to about 90° C. Stirring was then stopped, the resulting PBP was permitted to settle and the oil decanted leaving PBP at the bottom of the container. The oil was washed from the PBP with ethylene dichloride, and the PBP separated by filtration. The recovered solvent-free PBP was white in color and had an average diameter in the range from 300–600 microns. When an amount of the PBP was placed on a hot surface at a temperature of about 300° C. the PBP fused and adhered thereto as a colorless transparent film.

EXAMPLE NO. 7

Preparation of PBP

PBP was prepared by adding 4.36 grams of 1,4-butanediol to 23.48 grams of a 20% blocked prepolymer, as prepared in Example No. 6, to yield a reaction admixture having an NCO/OH ratio of 1 wherein the NCO includes both the free and the blocked isocyanate groups. After about 7 minutes the resulting mixture was warm to the touch. Thereupon, the liquid reaction mixture was added as a thin stream to the vortex of a stirred heated oil bath at a temperature of about 140° C. The resulting PBP was recovered from the oil bath by filtering and washed to remove the oil. The particle-size of the PBP recovered on the filter was about 100 microns but particles smaller than about 75 microns in diameter were observed to pass through the filter.

EXAMPLE NO. 8

Preparation of PBP

A liquid mixture containing 80.5 grams of a 15% blocked isocyanate prepolymer prepared by reacting 108 grams of Isonate No. 225 (Upjohn Co.) and 7.05 grams of phenol was admixed with 15.26 grams of 1,4-butanediol and 0.15 gram of dibutyltin dilaurate. The resulting liquid admixture was then added as a thin stream to a stirred oil bath maintained at a temperature in the range 108°–115° C. Repeated additions of the liquid reaction mixture resulted in the production of PBP which was recovered from the oil bath. The resulting produced PBP had a particle-size in the range from about 100 microns to about 600 microns, depending upon the vigor with which the oil bath was stirred and the rate of addition of the liquid reaction admixture. Small particle-size PBP in the submicron range and larger particle-size PBP in the range about 10–100 microns could be prepared by this method by controlling the rate of addition of the liquid reaction admixture and the vigor (degree of agitation) with which the oil bath is stirred.

EXAMPLE NO. 9

Preparation of PBP

There was prepared an admixture containing 2 grams motor oil as plasticizer, 56 grams of a 25% phenol blocked isocyanate prepolymer prepared from 1742 grams of isocyanate terminated prepolymer, Isonate No. 226 supplied by the Upjohn Co., and 174.6 grams of crystalline phenol. To this admixture was added 10.75 grams of 1,4-butanediol admixed with dibutyltin dilaurate in the amount of 0.25 gram/100 grams of the diol. The resulting liquid admixture was then added as a thin stream to a stirred water bath maintained at a temperature of about 48° C. and containing a water softener (Calgon) and an anionic surfactant, Triton QS9. The admixture of prepolymer and diol was added to the water bath by pouring a thin stream thereof into the vortex created in the water bath by a two-blade stirrer. The resulting admixture in the water bath was stirred for an additional period of 15 minutes, upon completion of the addition of the liquid admixture thereto. The contents were filtered through a 44 micron filter and washed with water. About 80% of the resulting produced finely divided PBP was maintained on the filter and the smaller particle-size PBP, i.e. smaller than 44 microns, passed through the filter with the bath water. The PBP retained on the filter was of uniform particle-size and after drying, upon being heated, exhibited thermoplasticity, cross-linking and adhesion.

Substantially the same procedure was carried out employing dibutyl phthalate as the plasticizer in place of the motor oil and the resulting produced PBP exhibited equivalent properties. Instead of dibutyl phthalate other known plasticizers and mixtures thereof may be employed, including the non-reactive and reactive plasticizers such as the glycerol dimethacrylate and the allyl plasticizers.

EXAMPLE NO. 10

Preparation of PBP 232 grams of a 40% blocked prepolymer prepared by reacting 200 grams of an MDI-terminated polyester containing about 18.8% NCO (Isonate No. 226 supplied by Upjohn Co.) and 32 grams of phenol were admixed with 40 grams of technical grade 1,4-butanediol and the resulting admixture placed into a pressurized container at a temperature of about 40° C. The container was pressurized with nitrogen to 40 psig. The container was provided with an outlet and a tubing connected thereto. The other end of the tubing was provided with an orifice having an opening of about 0.045 inch diameter. The contents of the pressurized container was discharged through the tubing and orifice as a fine mist onto a stirred heated water bath maintained at a temperature of about 80° C. The bath container a water softener (Calgon) and an anionic surfactant (Abex VA-40, supplied by Alcolac Corp.). There was produced and recovered from the water bath by filtration micro-size particles of PBP of approximately colloidal dimension.

EXAMPLE NO. 11

Preparation of PBP 55 grams of 25% blocked prepolymer prepared by reacting 50 grams of MDI terminated polyester prepolymer (Isonate No. 226 supplied by Upjohn Co.) and 5 grams of phenol were reacted with 7.5 grams of 1,4-butanediol. The resulting admixture was then introduced as a thin stream into the vortex of a vigorously stirred water bath maintained at a temperature of about 48° C. The water bath contained 6 grams of a water softener, Calgon, and 15 grams of an anionic surfactant (Abex VA-40 supplied by Alcolac Corp.) in 1400 ml of water. The reaction admixture and resulting formed particles or droplets, representing the formative PBP, were maintained and stirred in the water bath for an additional 30 minutes and the water bath and its contents then filtered through an 88 micron filter for the recovery of the PBP. After filtration the PBP was dried. It was observed that the recovered PBP when heated was thermoplastic and the fused PBP was found to adhere strongly to glass and aluminum surfaces.

EXAMPLE NO. 12

Polyethylene-PBP Blends

Powdered polyethylene SDP 640 supplied by Sinclair-Koppers having a particle-size of about 5 microns and in the amount of 10 grams was admixed with 2.5 grams PBP prepared in accordance with Example No. 11 having a particle-size of about 100 microns. The resulting powdery admixture of polyethylene and PBP containing 20% by weight PBP was spread evenly onto a 5 inch diameter aluminum surface and fused into a film by infrared radiation thereon, the surface temperature of the applied powdery admixture being maintained below 150° C. There was produced a uniform film of polyethylene and PBP containing 20% by weight PBP. This film, when placed between two glass surfaces and heated with pressure, served to strongly adhere and attach together the glass surfaces.

In a similar manner, a blend containing 10 parts by weight polyethylene and 1.25 parts by weight PBP having a particle-size of less than 175 microns was prepared and the resulting blend containing 12.5% PBP was fused to form a film. This film was placed between two glass surfaces and upon the application of pressure and heat to unblock the PBP, the glass surfaces were joined together and could not be pulled apart.

In a similar manner a blend of polyethylene and PBP containing 5% PBP was prepared and the resulting blend of 5% PBP when prepared in film form was found to permanently adhere opposed glass surfaces upon the application of heat and pressure.

EXAMPLE NO. 13

PBP-Polyethylene Film 10 parts by weight of powdered polyethylene were admixed with 10 parts by weight PBP and the resulting admixture fused into a sheet of about ⅛ inch thick by spreading the admixture onto a surface and melting the polyethylene. After fusion of polyethylene, entrapping the admixed PBP therein, the resulting film were tested. In one test, two flat glass surfaces were heated to above the unblocking temperature of the PBP. A film containing the PBP dispersed in polyethylene was placed between the heated bottom surfaces of two glass jars, pressed therebetween and heated above the unblocking temperature of the PBP. The film containing the PBP fused and upon cooling the two glass jars were found to be strongly and firmly bound together. In another test ordinary polyethylene gilm was similarly treated but it was found that the opposed glass surfaces readily separated from the polyethylene and were not bound together.

Polyethylene-PBP films containing as much as 25% by weight PBP and as little as 2.5% by weight PBP all exhibited a strong bond and adhesion to glass surfaces when pressed between glass surfaces and heated to a temperature above the unblocking temperature of PBP. In addition to improving the adhesiveness of the polyethylene to glass surfaces, and indeed to metal surfaces, such as aluminum surfaces, the PBP containing polyethylene films and the like exhibit increased hardness, flex modulus and softening temperature.

PBP when dispersed in a film of thermoplastic resin, even when present in minor amounts as low as from about 0.5% and as much as 25-40% by weight imparts improved physical properties and strong adhesive properties to the resulting compositions. Thermoplastic resins which are improved, particularly with respect to their ability to adhere to glass and metal surfaces by incorporating PBP therein include, in addition to polyethylene, polyvinyl chloride, polystyrene and other thermoplastic resins. Instead of incorporating the PBP in association with a thermoplastic resin and employing the resulting thermoplastic resin and PBP in film form, a powdery admixture of the thermoplastic resin and the PBP can be formed and applied directly to a surface to be coated. Upon heating of the applied powdery admixture thereon a film or coating containing the PBP would be formed. If the heating is sufficient to unblock the blocked isocyanate groups the resulting formed film would be strongly adhered to the coated surface or substrate and the resulting formed film would exhibit improved chemical and/or physical properties.

EXAMPLE NO. 14

Preparation of PBP

Into a 4-liter beaker provided with a two-blade stirrer, the beaker containing 3600 ml of water at a temperature of about 48°-51° C. and having Calgon water softener in the amount of 15 grams and Abex VA-40 anionic surfactant in the amount of 54 grams dissolved therein, there were separately added four liquid reaction admixtures prepared from 108 grams of a 20% blocked isocyanate prepolymer and 15 grams of 1,4-butanediol. The 20% blocked prepolymer was prepared by reacting Isonate No. 226 supplied by Upjohn and phenol in the amounts providing 8 mols NCO and 1.6 mol phenol, respectively. The four liquid reaction admixtures were poured one at a time into the side of the vortex created by the stirrer within the water bath. The resulting formed and emulsified droplets of the reaction admixture, formative PBP, were maintained with stirring in a water bath for a period of about 1 hour. Thereafter, the resulting PBP was filtered from the water bath through an 88 micron sieve and oven dried at a temperature of about 40° C.

EXAMPLE NO. 15

Preparation of PBP

A liquid reaction admixture made up of 1380 parts by weight of 25% blocked isocyanate prepolymer, 150 parts by weight 1,4-butanediol and 0.10 part by weight dibutyl tin dilaurate catalyst and containing a volatile diluent (benzene) was prepared and stirred. The 25% blocked isocyanate prepolymer was obtained by reacting Isonate No. 226 supplied by the Upjohn Co. and containing 18.8% NCO derived from MDI terminated prepolymer with phenol. The resulting reaction admixture was prepared in a 5-gallon plastic bucket. After approximately 3 minutes the temperature of the reaction admixture approached the boiling point of the benzene which was present in the reaction admixture. As the benzene boiled from the reaction admixture the reaction admixture was stirred and a froth was created. Eventually the bucket was filled with a solid foam. The foam was broken up and separated into portions of varying particle-size to provide PBP of a desired or selected particle-size. The thus-produced PBP was found to exhibit thermoplasticity and adhesive properties when applied to metal or glass, particularly when heated thereon under pressure and at a temperature above the unblocking temperature of the blocked isocyanate groups.

EXAMPLE NO. 16

Preparation of PBP 125 grams of a 25% blocked, plasticized prepolymer was prepared by reacting 100 grams of an MDI-terminated polyester (Isonate 226; Upjohn Co.), 10 grams of phenol and 0.11 grams of trimethylamine for 1 hour at 90°-105° C. under a blanket of nitrogen and then plasticizing with 16 grams of dibutylphthalate.

The 25% blocked, plasticized prepolymer was admixed with 18.0 grams of 1,4-butanediol and 0.25 gram of dibutyl tin dilaurate and poured into a blander of approximately 1 liter capacity (Osterizer Co.), operating at maximum speed and containing 450 ml of distilled water, 3 grams of an anionic surfactant (Abex VA-40; Alcolac Chem. Co.) and 3 grams of Calgonite-211, (Calgon Corp.) at a temperature of 50° C. After 3 minutes the contents of the blender were transferred to an aging bath consisting of 600 ml $H_2O$ at 50° C. and stirred for 1 hour.

The PBP particles were filtered, washed with water and dried. The particles were of a uniform size, ~25 $\mu$ in diameter. They exhibited thermoplastic properties when heated, could be fused into elastomeric material and displayed tenacious adhesion to surfaces containing "active" hydrogen when unblocking was achieved.

The PBP produced in accordance with this invention is useful for the preparation of PBP-containing films, castings or extrudates and may be compounded and cured in the manner of rubber. The PBP provides a stable high molecular weight thermoplastic, elastoplastic resin which requires no mixing or milling. The PBP can be processed directly in conventional high speed injection molding machines. Cross-linking of the PBP during processing can be achieved by simply compressing the PBP above its deblocking temperature. The small particle-size of the PBP permits flow of the PBP through the narrow channels, sprues and orifices of the injection and extrusion machines. The reactivity of the functional groups at the deblocking temperature of PBP is proportional to the surface area of the PBP. Accordingly, smaller particle-size PBP is more active. Should additional cross-linking be desired in the PBP, it could be achieved by incorporating therein a peroxide. Peroxide vulcanization of polyurethane is known and would be particularly useful in the vulcanization or cross-linking of PBP.

PBP can be admixed with a number of thermoplastic resins containing functional groups, such as unsaturated groups. The PBP above the deblocking temperature is reactive with such diverse resins as phenol formaldehyde resins, alkyd resins, cellulose nitrate, cellulose acetate and the various vinyl resins. When PBP is incorporated in such resins even in minor amounts in the range from about 0.5–2.0% to 20–25% by weight the resulting product after having been heated above the deblocking temperature of the PBP has improved hardness, reduced thermoplasticity and other improved chemical and physical properties. The PBP when incorporated in brittle polymeric materials also improves the impact resistance of such materials.

The PBP prepared in accordance with this invention is particularly useful when incorporated in natural or synthetic elastomers to improve the adhesive properties thereof. PBP is also useful as a material for coating or laminating a wide variety of substrates, such as metal and non-metal substrates, including glass, paper, mineral and ceramic substrates. Since PBP is a powder and is thermally activated, it is particularly useful in electrostatic powder coating operations and other operations wherein particulate material is applied to a surface for the eventual formation of a coating thereon. Further, as indicated hereinabove, the PBP is especially useful in the manufacture of laminated products, wherein two opposed surfaces are joined by a layer or film containing PBP. Upon heating and activation or unblocking of the PBP, the PBP would promote the formation of a tough, adherent coating on the opposed substrate surfaces and form a strong bond therebetween. By employing PBP having blocked NCO groups which unblock at different temperatures depending on the blocking agents employed, the versatility and utility of PBP as a coating or laminating material or for other uses is increased.

Since PBP is thermoplastic, at least up to the unblocking temperature, and is in finely divided powder form, the PBP is especially useful for the production of long continuous shapes, such as tubing, rods, sheets and the like. These shapes can be produced, for example, by forcing the PBP or a thermoplastic resin mix containing PBP through a die or through a nip of calendar rolls under conditions of temperature and pressure such that the PBP is unblocked and the unblocked PBP activated and thermoset or polymerized or reacted with the surrounding matrix material.

As will be apparent to those skilled in the art in the light of the foregoing disclosure, many modifications, alterations and substitutions are possible in the practice of this invention without departing from the spirit or scope thereof.

I claim:

1. A composition comprising solid particle-form thermoplastic, polymerizable or cross-linkable, multi-functional polymeric material containing blocked isocyanate groups together with urea and/or urethane linkages and wherein the blocked isocyanate groups making up said polymeric material comprise only a portion of the total isocyanate groups employed to produce said polymeric material, said polymeric material upon increase in temperature sufficient to unblock said blocked isocyanate groups being capable of undergoing polymerization or cross-linking, substantially uniformly dispersed in, distributed on or admixed with a particle-form thermoplastic resin selected from from the group consisting of polyethylene, polyvinyl chloride and polystyrene.

2. A composition comprising 0.5–40% by weight of a solid particle-form thermoplastic, polymerizable or cross-linkable, multi-functional polymeric material containing blocked isocyanate groups together with urea and/or urethane linkages and wherein the blocked isocyanate groups making up said polymeric material comprise only a portion of the total isocyanate groups employed to produce said polymeric material, said polymeric material upon increase in temperature sufficient to unblock said blocked isocyanate groups being capable of undergoing polymerization or cross-linking and a particle-form thermoplastic resin selected from the group consisting of polyethylene, polyvinyl chloride and polystyrene.

3. A composition in accordance with claim 2 wherein said thermoplastic resin is polyethylene.

4. A composition in accordance with claim 2 wherein said thermoplastic resin is a polyvinylchloride.

5. A composition in accordance with claim 2 wherein said thermoplastic resin is polyethylene and wherein said polymeric material is present in said composition in an amount in the range 2.5–25% by weight.

6. A composition in accordance with claim 1 wherein said resin is a polystyrene.

7. A composition comprising 0.5–25% by weight of a solid particle-form thermoplastic, polymerizable or cross-linkable, multi-functional polymeric material containing block isocyanate groups together with urea and/or urethane linkages and wherein the blocked isocyanate groups making up said polymeric material comprise only a portion of the total isocyanate groups employed to produce said polymeric material, said polymeric material upon increase in temperature sufficient to unblock said blocked isocyanate groups being capable of undergoing polymerization or cross-linking and a solid particle-form resin selected from the group consisting of phenol formaldehyde resin, alkyd resin, cellulose nitrate and cellulose acetate.

* * * * *

UNITED STATES PATENT AND TRADEMARK OFFICE
CERTIFICATE OF CORRECTION

PATENT NO. : 4,101,473
DATED : July 18, 1978
INVENTOR(S) : Harry L. Lander

It is certified that error appears in the above-identified patent and that said Letters Patent are hereby corrected as shown below:

Column 1, line 11, "article" should read -- articles --

Column 10, first line of formula, that portion reading

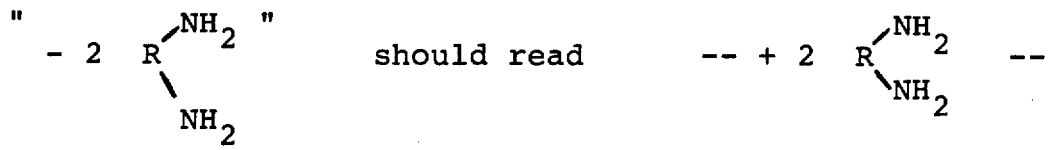

Column 14, line 4, "gilm" should read -- film --

Column 15, line 32, "blander" should read -- blender --

Signed and Sealed this

First Day of May 1979

[SEAL]

Attest:

RUTH C. MASON
Attesting Officer

DONALD W. BANNER
Commissioner of Patents and Trademarks